(12) United States Patent
Neill et al.

(10) Patent No.: US 10,620,138 B2
(45) Date of Patent: Apr. 14, 2020

(54) METHODS AND APPARATUS FOR DIRECT MULTIPLICATION FOURIER TRANSFORM MILLIMETER WAVE SPECTROSCOPY

(71) Applicant: BrightSpec, Inc., Charlottesville, VA (US)

(72) Inventors: Justin L. Neill, Charlottesville, VA (US); Brent Harris, Charlottesville, VA (US); Brooks Hart Pate, Charlottesville, VA (US)

(73) Assignee: BrightSpec, Inc., Charlottesville, VA (US)

( * ) Notice: Subject to any disclaimer, the term of this patent is extended or adjusted under 35 U.S.C. 154(b) by 0 days.

(21) Appl. No.: 16/021,476

(22) Filed: Jun. 28, 2018

(65) Prior Publication Data
US 2019/0033235 A1 Jan. 31, 2019

Related U.S. Application Data

(63) Continuation of application No. PCT/US2017/012509, filed on Jan. 6, 2017.
(Continued)

(51) Int. Cl.
*G01N 22/00* (2006.01)
*G01J 3/44* (2006.01)
(Continued)

(52) U.S. Cl.
CPC ............ *G01N 22/00* (2013.01); *G01J 3/42* (2013.01); *G01J 3/44* (2013.01); *G01J 3/453* (2013.01);
(Continued)

(58) Field of Classification Search
CPC .. G01N 22/10; G01N 21/636; G01N 21/3581; G01N 2021/3595; G01J 3/42; G01J 3/44; G01J 3/453
(Continued)

(56) References Cited

U.S. PATENT DOCUMENTS 5,151,661 A 9/1992 Caldwell et al.
8,748,822 B1 6/2014 Gerecht et al.
(Continued)

FOREIGN PATENT DOCUMENTS

WO 2015195641 A2 12/2015

OTHER PUBLICATIONS

Brown et al. "A broadband Fourier transform microwave spectrometer based on chirped pulse excitation", Review of Scientific Instruments 79, 053103 (2008) (Year: 2008).*
(Continued)

*Primary Examiner* — Nicole M Ippolito
(74) *Attorney, Agent, or Firm* — Smith Baluch LLP

(57) ABSTRACT

Methods and apparatuses for direct multiplication Fourier transform millimeter wave spectroscopy are disclosed herein. A sample method includes generating at least one pulse of microwave electromagnetic energy. The sample method also includes frequency-multiplying the pulse(s) to generate at least one frequency-multiplied pulse and filtering at least one spurious harmonic of the frequency-multiplied pulse to generate at least one filtered pulse. The spurious harmonic is generated by frequency-multiplying the pulse. The method also includes exciting a sample using the filtered pulse. The method further includes detecting an emission from the sample. The emission is elicited at least in part by the filtered pulse.

20 Claims, 6 Drawing Sheets

Related U.S. Application Data

(60) Provisional application No. 62/275,996, filed on Jan. 7, 2016.

(51) Int. Cl.

| | | |
|---|---|---|
| *G01J 3/42* | (2006.01) | |
| *G01J 3/453* | (2006.01) | |
| *G01N 21/63* | (2006.01) | |
| *G01N 21/35* | (2014.01) | |
| *G01N 21/3581* | (2014.01) | |

(52) U.S. Cl.
CPC ....... *G01N 21/636* (2013.01); *G01N 21/3581* (2013.01); *G01N 2021/3595* (2013.01)

(58) Field of Classification Search
USPC ...................................................... 250/492.1
See application file for complete search history.

(56) References Cited

U.S. PATENT DOCUMENTS

| | | |
|---|---|---|
| 8,873,043 B2 | 10/2014 | Pate et al. |
| 9,046,462 B2 | 6/2015 | Pate et al. |
| 9,442,079 B2 | 9/2016 | Pate et al. |
| 9,482,577 B2 | 11/2016 | Pate et al. |
| 9,778,112 B2 | 10/2017 | Pate et al. |
| 9,857,315 B2 | 1/2018 | Patterson et al. |
| 9,891,165 B2 | 2/2018 | Pate et al. |
| 9,921,170 B2 | 3/2018 | Pate et al. |
| 10,107,744 B2 * | 10/2018 | Pate .......................... G01J 3/10 |
| 2009/0122296 A1 | 5/2009 | Ohishi et al. |
| 2009/0184761 A1 | 7/2009 | Reynaert et al. |
| 2013/0154611 A1 * | 6/2013 | Pate ................... G01N 21/3586 324/76.19 |
| 2013/0265573 A1 | 10/2013 | Pate et al. |
| 2015/0097118 A1 | 4/2015 | Zheng et al. |
| 2017/0343695 A1 * | 11/2017 | Stetson ................. G01V 3/101 |
| 2018/0052051 A1 | 2/2018 | Pate et al. |
| 2018/0209851 A1 * | 7/2018 | Bartels ...................... G01J 3/44 |

OTHER PUBLICATIONS

International Search Report and Written Opinion in PCT/US2017/012509 dated May 5, 2017, 13 pages.

Extended European Search Report in European Patent Application No. 17736419.7 dated Jul. 30, 2019, 9 pages.

Neill et al., "Segmented chirped-pulse Fourier transform submillimeter spectroscopy for broadband gas analysis," Optics Express, vol. 21, No. 17, Aug. 26, 2013.

Park et al., "Design and evaluation of a pulsed-jet chirped-pulse millimeter-wave spectrometer for the 70-102 GHz region." The Journal of chemical physics 135.2 (2011): 024202.

Steber et al., "An arbitrary waveform generator based chirped pulse Fourier transform spectrometer operating from 260 to 295 GHz." Journal of Molecular Spectroscopy 280 (2012): 3-10.

Uher et al., "Tunable microwave and millimeter-wave band-pass filters." IEEE Transactions on Microwave Theory and Techniques 39.4 (1991): 643-653.

\* cited by examiner

METHODS AND APPARATUS FOR DIRECT MULTIPLICATION FOURIER TRANSFORM MILLIMETER WAVE SPECTROSCOPY

CROSS-REFERENCE TO RELATED APPLICATIONS

This application is a bypass continuation of International Application No. PCT/US2017/012509, filed on Jan. 6, 2017, which in turn claims the priority benefit, under 35 U.S.C. § 119(e), of U.S. Application No. 62/275,996, filed on Jan. 7, 2016. Each of these applications is incorporated herein by reference in its entirety.

GOVERNMENT SUPPORT

This invention was made with Government support under Grant No. W31P4Q-15-C-0019 awarded by the U.S. Army. The Government has certain rights in the invention.

BACKGROUND

Spectroscopy, such as rotational spectroscopy, is a powerful structural tool in physical chemistry. For example, the relationship between the molecular structure and the rotational transition frequencies can be used for structure determination of gas phase samples. Other effects in the rotational motion of molecules, such as centrifugal distortion, hyperfine spectral structure from quadrupolar nuclei, or frequency shifts caused by tunneling motion, can be used to provide further characterization of the molecular structure and low frequency vibrational motions.

Fourier transform spectroscopy in the millimeter (mm) wave or terahertz (THz) frequency region is particularly useful for chemical detection and characterization. Typical approaches to generate useful frequencies from common sources (e.g., Digital-to-Analog converters) involves the use of frequency mixers, where phase coherence between the excitation source and a frequency reference source of the frequency mixer can be challenging to attain. There is hence an unmet need for approaches that permit for phase reproducibility during acquisition in Fourier transform millimeter wave spectroscopy.

Additionally, signal generation in Fourier transform spectroscopy typically employs the use of a fixed frequency source, such as a clock, to trigger signal generation. This is needed to maintain phase reproducibility from one acquisition to the next, but limits and/or otherwise impedes the ability of the signal generator to receive trigger signals and/or events originating from events that do not necessarily occur in a fixed-frequency manner or setting. Accordingly, there is an unmet need for approaches that permit synchronization of signal generation and/or acquisition to external, sometimes asynchronous, events.

SUMMARY

Disclosed herein are methods and apparatus for direct multiplication Fourier transform millimeter wave spectroscopy. In some embodiments, a method includes generating at least one pulse of microwave electromagnetic energy. The method also includes frequency-multiplying the pulse(s) to generate at least one frequency-multiplied pulse. The method further includes filtering at least one spurious harmonic of the frequency-multiplied pulse to generate at least one filtered pulse. The spurious harmonic is generated by frequency-multiplying the pulse. The method also includes exciting a sample using the filtered pulse. The method further includes detecting an emission from the sample. The emission is elicited at least in part by the filtered pulse.

In some embodiments, an apparatus includes a signal generator configured for generating at least one pulse of microwave electromagnetic energy. The apparatus also includes a frequency multiplier circuit coupled to the signal generator. The frequency multiplier circuit is configured for frequency-multiplying the at least one pulse to generate at least one frequency-multiplied pulse. The apparatus also includes a filter circuit coupled to the frequency multiplier circuit. The filter circuit is configured for filtering at least one spurious harmonic of the frequency-multiplied pulse to generate a filtered pulse. The spurious harmonic is generated by frequency-multiplying the pulse, and the filter circuit further configured for exciting a sample using the filtered pulse. The apparatus also includes an emission detector configured for detecting an emission from the sample, the emission elicited at least in part by the filtered pulse.

In some embodiments, a method includes generating, with a free-running signal generator, at least one pulse of microwave electromagnetic energy. The method also includes frequency-multiplying the at least one pulse to generate at least one frequency-multiplied pulse. The method also includes exciting a sample using the at least one frequency-multiplied pulse. The method also includes detecting an emission from the sample, the emission elicited at least in part by the at least one frequency-multiplied pulse.

In some embodiments, an apparatus includes a signal generator configured to generate at least one pulse of microwave electromagnetic energy in response to a trigger signal. The apparatus also includes a frequency multiplier circuit coupled to the signal generator. The frequency multiplier circuit is configured to frequency-multiply the at least one pulse to generate at least one frequency-multiplied pulse. The frequency multiplier circuit is further configured to excite a sample using the at least one frequency-multiplied pulse. The apparatus also includes an emission detector configured to detect an emission from the sample, the emission elicited at least in part by the at least one frequency-multiplied pulse.

In some embodiments, a method includes generating, with a free-running signal generator, a first microwave pulse and a second microwave pulse in response to a first trigger signal. The first microwave pulse is frequency-multiplied to form a first millimeter-wave signal, the first millimeter-wave signal including a first millimeter-wave pulse and a first spurious emission. The method also includes filtering the first spurious emission harmonic from the first millimeter-wave signal to yield the first millimeter-wave pulse. The second microwave pulse is frequency-multiplied to form a second millimeter-wave signal that includes a second millimeter-wave pulse and a second spurious emission. The method also includes filtering the second spurious emission harmonic from the second millimeter-wave signal to yield the second millimeter-wave pulse. The method also includes exciting a sample with the first millimeter-wave pulse to produce a first sample emission and mixing the first sample emission with the second millimeter-wave pulse to produce a first downconverted sample emission. The method also includes detecting the first downconverted sample emission to produce a first electronic signal. The method further includes generating, with the free-running signal generator, a third microwave pulse and a fourth microwave pulse in response to a second trigger signal. The third microwave pulse and the fourth microwave pulse are phase-coherent with the first microwave pulse and the second microwave pulse. The method also includes frequency-multiplying the third microwave pulse to form a third millimeter-wave signal, the third millimeter-wave signal including a third millimeter-wave pulse and a third spurious emission. The method also includes filtering the third spurious emission harmonic from the third millimeter-wave signal to yield the third millimeter-wave pulse. The method also includes frequency-multiplying the fourth microwave pulse to form a fourth millimeter-wave signal, the fourth millimeter-wave signal including a fourth millimeter-wave pulse and a fourth spurious emission. The method further includes filtering the fourth spurious emission harmonic from the fourth millimeter-wave signal to yield the fourth millimeter-wave pulse. The method also includes exciting the sample with the third millimeter-wave pulse to produce a second sample emission, which is phase-coherent with the first sample emission, and mixing the second sample emission with the fourth millimeter-wave pulse to produce a second downconverted sample emission. The method also includes detecting the second downconverted sample emission to produce a second electronic signal. The first and second electronic signals are averaged, e.g., to increase SNR, improve sensitivity, or both.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
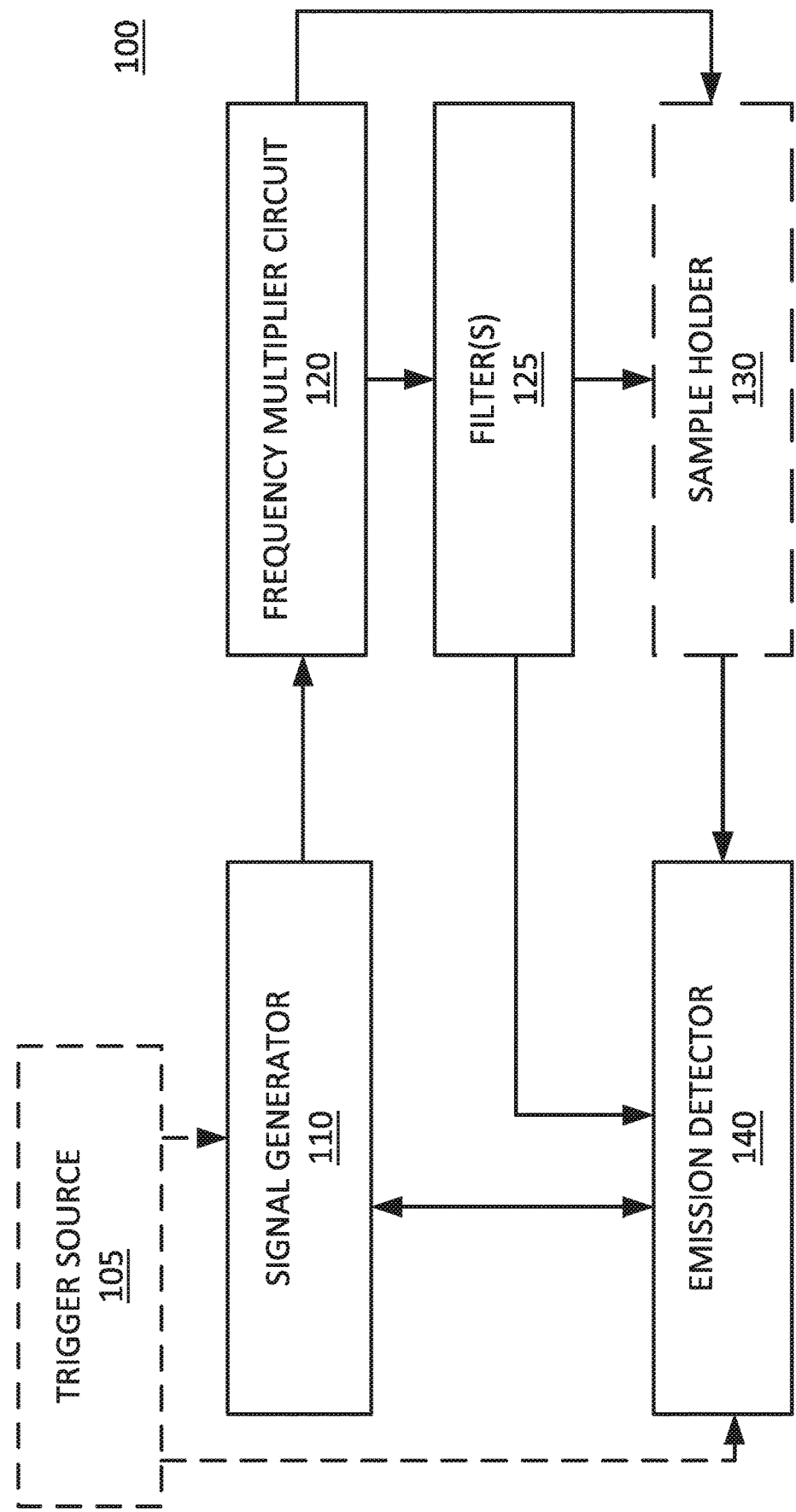
FIG. 1 is a system for Fourier transform millimeter wave spectroscopy, according to embodiments.

As used in this specification, the singular forms "a," "an" and "the" include plural referents unless the context clearly dictates otherwise.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

Aspects of the methods and apparatus disclosed herein are beneficial for accurate signal acquisition in direct multiplication Fourier transform millimeter wave spectroscopy without the use of frequency sources other than the excitation source(s), such as local oscillators.

As used herein, the term "microwave", when used to modify the term "frequency" or "frequency range", or variants thereof, is any frequency value or frequency range from about 0 Hz (e.g., direct current) to about 40 GHz. As used herein, the term "millimeter-wave", when used to modify the term "frequency" or "frequency range", or variants thereof, is any frequency value or frequency range from about 30 GHz to about 300 GHz. Accordingly, it follows that frequencies in the 30-40 GHz range can be characterized as both microwave and millimeter wave. As used herein, the term "submillimeter", when used to modify the term "frequency" or "frequency range", or variants thereof, is any frequency value or frequency range from about 300 GHz to about 3000 GHz. As used herein, the term "terahertz", when used to modify the term "frequency" or "frequency range", or variants thereof, is any frequency value or frequency range from about 100 GHz (i.e., about 0.1 THz) to about 10000 GHz (i.e., about 10 THz). Accordingly, it follows that frequencies in the 300-3000 GHz range can be characterized as both submillimeter wave and Terahertz.

As used herein, the terms "frequency multiplication", "frequency multiplier", and variants thereof, refer to the use of electronic circuit(s) to generate, based on an input signal having an input frequency, an output signal having an output frequency that is a multiple of the input frequency. For example, when the input signal has an input frequency in a range from about 5 MHz to about 5 GHz, the output signal can have an output frequency in a range from about 10 MHz to about 10 GHz, and so on. Such electronic circuits can include, but are not limited to, clipping circuits, Class A amplifiers, Class B amplifiers, Class C amplifiers, diode-based circuits, microelectromechanical (MEMS) frequency doublers, and/or the like.

As used herein, the term "upconversion" and variants thereof refer to the translation of a signal at a first frequency or a first range of frequencies to a relatively higher second frequency or a second range of frequencies. Upconversion can be accomplished by mixing the signal at the first frequency with a higher-frequency local oscillator using a mixer. Similarly, the term "downconversion" refers to translating a signal at a first frequency or first range of frequencies to a lower second frequency or lower second range of frequencies, e.g., using a mixer and a lower-frequency local oscillator. The local oscillator can operate at a frequency that is lower or higher than that of the signal. A mixer will typically produce a first output having a frequency that is the sum of the input frequencies (of the signal and the local oscillator) and also produce a second output having a frequency that is the difference of the input frequencies. In some embodiments, downconversion can include selection of the second output, such as via a low-pass filter. In some embodiments, downconversion can include selection of the first output after attenuation. As used herein, the term "local oscillator" refers to a sinusoidal signal at a characteristic frequency, such as can be used with a mixer for upconversion or downconversion. The term "local oscillator" may also refer to the synthesizer or other electronic component that generates such a sinusoidal signal.

As used herein, the term "frequency standard" and variants thereof refer to a stable oscillator generating a fundamental frequency with acceptable precision. As is known in the art, a frequency standard can be used to control the frequency of other electronic devices. For instance, a typical commercially available rubidium frequency standard emits a 10 MHz clock signal that can be used as a frequency reference for ensuring the frequency stability a microwave synthesizer, arbitrary waveform generator, or other electronic component.

Embodiments of the present technology include a system for direct multiplication Fourier transform millimeter-wave spectroscopy. Unlike conventional Fourier transform millimeter-wave spectroscopy, an inventive direct multiplication Fourier transform millimeter-wave spectroscopy system does not upconvert signals, e.g., from microwave frequencies to millimeter-wave frequencies. Instead, it includes one or more frequency multipliers that multiply lower-frequency signals, such as microwave chirped pulses, to produce higher-frequency signals, such as millimeter-wave chirped pulses.

An inventive system may include one or more filters to remove spurious emissions (spurs), including spurious intermodulation products and spurious harmonics, generated during the frequency-multiplication process. Spurious intermodulation products are caused by nonlinear interactions between different spectral components during the frequency-multiplication process and typically appear at frequencies equal to the sum(s) and difference(s) between those spectral components. Spurious harmonics also result from nonlinear interactions and appear at integer multiples of the frequency of the signal being frequency multiplied. The spurious emissions produced during frequency multiplication are not necessarily produced by upconversion and therefore do not have to be filtered in a spectroscopy system that upconverts low-frequency signals.

Because such an inventive system does not upconvert low-frequency signals, it does not require the mixers or local oscillators found in conventional systems for generating high-frequency signals. And because an inventive system can operate without a local oscillator, there is no need to synchronize the signal generator used to generate the lower-frequency signals to the synthesizer used to generate the local oscillator. As a result, an inventive system does not need an external frequency reference, such as a rubidium frequency standard, as used in a conventional Fourier-transform spectroscopy system. Put differently, an inventive system can use a free-running signal generator (i.e., a signal generator that is not synchronized to an external frequency reference) to produce lower-frequency pulses for frequency multiplication. Eliminating the need for an external frequency standard and a local oscillator makes an inventive system simpler and less expensive than a conventional system.

Using a free-running signal (unsynchronized) generator to generate the lower-frequency pulses for frequency multiplication also makes it possible to trigger acquisition of a sample emission by an inventive system in response to an external event or entity, such as a pulsed laser, molecular discharge source, process monitoring event, and/or the like, without waiting for the start of the next clock cycle. Since the signal generator is free-running, it defines the timebase itself, so the trigger event does not have to be locked to a specific clock cycle and/or other external reference external in order to maintain phase reproducibility from one acquisition to the next. This makes it easier to perform time domain signal averaging to improve sensitivity and/or increase the signal-to-noise ratio (SNR). Further, because the trigger event does not have to be locked to a clock or other external frequency reference, acquisition can begin immediately upon receipt of the trigger instead of waiting until the beginning of the next clock cycle, which could be up to one full clock period (e.g., 100 µs for a 10 MHz clock).

In some cases, acquisition may be accomplished by downconverting the sample emission induced by the millimeter-wave pulse(s). For instance, the sample emission may be downconverted by mixing the sample emission with another millimeter-wave pulse/pulse train generated by the same signal generator that generates millimeter-wave signal that is used to excite the sample (the excitation pulse). Because the excitation pulse and the other pulse/pulse train are generated by the same signal generator, they may be phase coherent with each other despite the absence of an external frequency reference. (Conversely, generating a phase-coherent local oscillator with a separate local oscillator synthesizer would require synchronizing the local oscillator synthesizer with the signal generator used to produce the microwave pulse(s) in order to maintain phase coherence.) The other pulse/pulse train may be at a frequency that is offset from the frequency of the excitation pulse/pulse train The downconverted sample emission can then be amplified, frequency-multiplied, digitized, and detected as understood in the art. And because subsequent pulses and sample emissions are phase coherent, the detected signals can be averaged or accumulated in the digital domain, e.g., to increase SNR. In this manner, aspects disclosed herein can encompass performing phase coherent heterodyne detection without use of a frequency standard such as a phase-locked local oscillator. Eliminating frequency mixing, local oscillators, and frequency standards for generating and locking local oscillators to the frequency source can also significantly reduces the system's complexity and cost.

Direct Multiplication Fourier Transform Millimeter-Wave Spectroscopy Systems

FIG. 1 illustrates a system 100 for direct multiplication Fourier transform millimeter wave spectroscopy. The system 100 includes a signal generator 110, a frequency multiplier circuit 120, one or more filters 125, and an emission detector 140. FIG. 1 also illustrates a sample chamber 130 which can (as indicated by the dotted lines) be an optional component of the system 100. FIG. 1 also illustrates a trigger source 105 which can (as indicated by the dotted lines) be an optional component of the system 100 and can, in some embodiments, be external to the system 100. In some embodiments, the system 100 can include additional components (not shown), including but not limited to a processor and a memory as described below. In some embodiments, the functionality of the components illustrated herein can overlap. For example, the signal generator 110, the frequency multiplier circuit 120, and the filter(s) 125 can be implemented as discrete components or as an integrated subsystem. The interconnection between various components of the system 100 can independently include, but are not limited to, electrical communication, electronic communication, optical communication, wireless communication, combinations thereof, and/or the like.

In some embodiments, the functionality of one or more of the signal generator 110, the frequency multiplier circuit 120, and the filter(s) 125 can be combined. For example, in some embodiments (not shown), the filter 125 can be absent, and the functionality of the filter 125 can be effectively implemented by the frequency multiplier circuit 120. For example, in some embodiments, the spurious harmonics can occur at frequencies that do not generate a significant downstream response from the frequency multiplier circuit 120. As another example, the effect of the spurious harmonics can be suppressed and/or mitigated by the design of the frequency multiplier circuit 120.

The signal generator 110 can include any electronic device generating a repeating or non-repeating electronic signal for excitation. Non-limiting examples of the signal generator 110 can include, but are not limited to, function generators, radio frequency (RF) signal generators, microwave signal generators, pitch generators, arbitrary waveform generators (AWGs), direct digital synthesizers (DDSs), digital pattern generators, or frequency generators. In some embodiments, the signal generator 110 includes a microwave frequency source, such as (for example) an AWG, a DDS, a voltage controlled oscillator-based synthesizer, and/or the like.

The signal generator 110 may be configured to generate a chirped pulse frequency comb, as generally disclosed in U.S. Pat. No. 9,046,462 titled "CHIRPED PULSE FREQUENCY-DOMAIN COMB FOR SPECTROSCOPY", filed Jun. 17, 2011, the entire disclosure of which is incorporated herein by reference. The signal generator 110 may also be configured for segmented chirped-pulse Fourier transform operation, as generally disclosed in U.S. Pat. No. 8,873,043 titled "SEGMENTED CHIRPED-PULSE FOURIER TRANSFORM SPECTROSCOPY", filed Jun. 7, 2013, the entire disclosure of which is incorporated herein by reference. The signal generator 110 can also be configured for frequency hopping spread spectrum operation, as generally disclosed in PCT Application no. PCT/US2015/035998 titled "FREQUENCY HOPPING SPREAD SPECTRUM (FHSS) FOURIER TRANSFORM SPECTROSCOPY", filed Jun. 16, 2015, the entire disclosure of which is incorporated herein by reference.

In some embodiments, the signal generator 110 is configured to generate a microwave pulse, including but not limited to a chirped pulse, a non-chirped pulse (e.g., a narrow bandwidth pulse), and/or the like. In operation, for instance, the signal generator 110 may generate a pulse train of microwave pulses, including but not limited to chirped pulses, frequency-agile pulses, frequency-agile chirped pulses, etc. In some embodiments, the microwave pulses include at least one chirped pulse within a frequency range from about 1 GHz to about 3 GHz, from about 1 GHz to about 4 GHz, from about 1 GHz to about 5 GHz, from about 1 GHz to about 6 GHz, from about 2 GHz to about 5 GHz, including all values and sub ranges in between. In order to generate pulses spanning these bandwidths, the signal generator 110 may operate at any suitable sample rate, such as about 4 Gigasamples/s (Gs/s), about 10 Gs/s, about 12 Gs/s, about 20 Gs/s, about 40 Gs/s, about 60 Gs/s, about 80 Gs/s, about 100 Gs/s, including all values and subranges in between.

As explained below, the signal generator 110 can operate on an internally derived timebase rather than an externally supplied timebase or clock. This permits the signal generator 110 to respond to a variable, random, and/or arbitrary trigger, such as, for example, a pulsed laser or pulsed nozzle, without a variable lag caused by the lack of synchronization between the trigger and the external timebase. In some embodiments, the signal generator 110 can operate on the internally derived timebase as well as an externally supplied timebase or clock coupled thereto. In this manner, the signal generator 110 can both response to variable triggers while maintaining phase coherence.

In some embodiments, the signal generator 110 can be configured to receive the trigger signal from an external source (e.g., the trigger source 105, such as a pulsed laser), and can be further configured to generate the pulse train in response to the trigger signal. In some embodiments, the signal generator 110 can be configured for generating the pulse train/microwave pulses in response to the trigger signal. The trigger signal can be any suitable signal that provides a change in intensity exceeding a predetermined threshold. Generally, the trigger signal provides a rising and/or falling pulse that is steep enough to act as a trigger for (among others) the excitation source. In some embodiments, the trigger signal can include a square pulse, such as a transistor-to-transistor logic (TTL) pulse. In some embodiments, the trigger signal has a suitable voltage value from about less than 1 V to about 10 V, including all values and subranges in between. In some embodiments, the trigger signal has a voltage value of about 5 V. In some embodiments, the trigger signal includes a pulse with a rise time (from low to high) in the order of a nanosecond or less, such as, for example, hundreds or tens of picoseconds. For instance, the trigger signal be provided by illuminating a photodetector with one or more ultrafast optical pulses from a Ti:Sapphire laser to produce a current or voltage whose amplitude varies in response to detection of the ultrafast optical pulses. In some embodiments, the rise time can be relatively slower, on the order of microseconds or more, since close synchronization with the signal generator 110 is not necessary.

In some embodiments, the signal generator 110 can be configured for two-channel operation, and can generate two pulse trains, one of which is used to excite the sample and one of which is used to detect an emission from the sample. In embodiments where the signal generator 110 can be configured for generating and/or receiving a trigger signal, the two pulse trains can both be generated in response to the trigger signal, and be in phase with each other. They may be generated simultaneously or delayed with respect to each other. In some embodiments, more than two-channel operation is possible, such as three-channel operation, four-channel operation, five-channel operation, and greater than five-channel operation.

The frequency multiplier circuit 120 receives the pulse train(s) from the signal generator 110 and frequency multiplies the pulse train(s) prior to sample excitation. The frequency multiplier circuit 120 can encompass any suitable number and/or arrangement of one or more components including, but not limited to, an amplifier, a frequency filter, a frequency multiplier, a switch, a microwave isolator, and/or the like. In some embodiments, the frequency multiplier circuit 120 can include one or more frequency multipliers (e.g., frequency doublers) configured to frequency-multiply the pulse train to a specified frequency to generate an frequency-multiplied pulse train. The specified frequency can be a millimeter-wave frequency and can range from about 50 GHz to about 150 GHz, from about 60 GHz to about 140 GHz, from about 70 GHz to about 130 GHz, from about 75 GHz to about 110 GHz, including all values and sub ranges in between.

In some embodiments, the frequency multiplier circuit 120 can include one or more amplifiers for amplifying the pulse train and/or the frequency-multiplied pulse train. In some embodiments, each amplifier can independently have an amplification factor between about 1 and about 2, about 3, about 4, about 5, about 6, about 8, about 10, including all values and subranges in between.

As illustrated in FIG. 1, one or more filters 125 are coupled to the frequency multiplier circuit 120 to receive the pulse train and/or the frequency-multiplied pulse train, and can be configured to attenuate, suppress, and/or substantially remove one or more spurious emissions, also sometimes referred to as spurs, from the pulse train and/or the frequency-multiplied pulse train to generate a filtered pulse train. As explained in greater detail below with respect to FIG. 4, these spurs may include spurious intermodulation products produced by, for example, nonlinear mixing during frequency multiplication and/or amplification between or among different spectral components within a given pulse (chirp) in the pulse train. In addition, or alternatively, the filters 125 can be configured to filter and/or substantially attenuate other types of spurious emissions, including spurious harmonics that are a byproduct of frequency multiplication. These spurs are contrasted with spurs generated by a conventional system using one or more frequency mixers, where frequency mixing the excitation source with another frequency source results in sideband spurs that recombine when passed through a frequency multiplier.

In some embodiments, the filters 125 include at least one cavity bandpass filter configured to pass a relatively narrow band of frequencies, such that undesirable frequencies that are close to the desirable frequencies are more likely to be removed and/or attenuated.

In some embodiments, the components of the frequency multiplier circuit 120 and filters 125 include a series of filter-amplifier-frequency multiplier components in cascade. In some embodiments, where the frequency multiplier circuit 120 generates a first pulse train and a second pulse train, the frequency multiplier circuit 120 can include a first frequency multiplier circuit for processing the first pulse train, and a second frequency multiplier circuit for processing the second pulse train in parallel. In some embodiments, the output frequency range of the frequency multiplier circuit 120 is from about 8 GHz to about 24 GHz, from about 10 GHz to about 22 GHz, from about 12 GHz to about 20 GHz, including all values and sub ranges in between.

In some embodiments, the system 100 can further include additional processing components after the frequency multiplier circuit 120 to attain a suitable measurement bandwidth. In some embodiments, the measurement bandwidth of the filtered pulse train is in a range from about 60 GHz to about 150 GHz, from about 65 GHz to about 130 GHz, from about 70 GHz to about 120 GHz, from about 75 GHz to about 110 GHz, including all values and sub ranges in between.

In operation, the filtered, frequency-multiplied output of the frequency multiplier circuit 120 and filters 125 excites the sample in the sample chamber 130 via a broadband antenna such as, for example, a gain horn antenna. Equipment suitable for broadcasting, directing, collimating, and/or focusing the millimeter wave beam includes, but is not limited to: gain horn antennas, scalar feed horns, flat mirrors, parabolic or spherical mirrors, lenses, and polarization-specific reflectors. In some embodiments, a first pulse of the filtered, frequency-multiplied output excites the sample in the sample chamber 130, and a second pulse of the filtered, frequency-multiplied output is mixed with sample emission as described in more detail herein.

Figure 3:
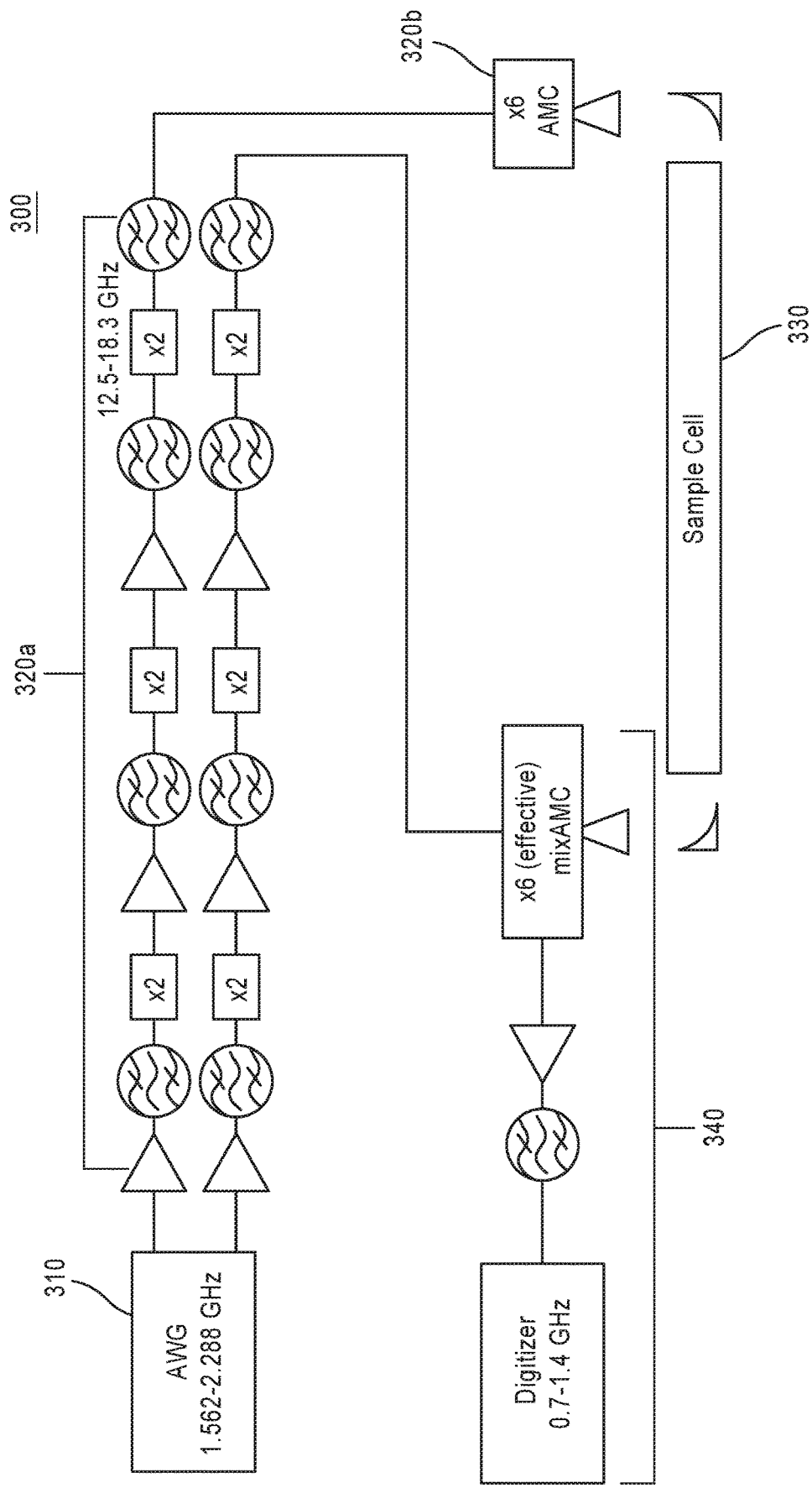
FIG. 3 is an example system based on the system of FIG. 1, according to embodiments.

Excitation of the sample can result in emission radiation, such as a Free Induction Decay (FID) emission, which in turn can be detected via the emission detector 140. In some embodiments, the emission detector 140 includes a bandwidth-limited component configured to receive and/or analyze the emission radiation (or a derivative thereof), such as a spectrometer and/or an analog-to-digital converter (ADC), or digitizer. In order to bring the emission within the range of the bandwidth-limited detector, the emission detector 140 can include a downconversion circuit, an example of which is shown in FIG. 3. In some embodiments, the downconversion circuit can include a mixer-amplifier-multiplier (mixAMC) chain that includes a frequency multiplier (e.g., a 6× multiplier). In some embodiments, the emission detector 140 can include additional processing components downstream of the downconversion circuit (e.g., before the bandwidth-limited component) such as, but not limited to, an amplifier and/or a filter (e.g., a cavity bandpass filter). In some embodiments, the bandwidth-limited component has an operational bandwidth in a range from about 0.2 GHz to about 3 GHz, from about 0.5 GHz to about 2.5 GHz, from about 1 GHz to about 2 GHz, from about 0.7 GHz to about 1.4 GHz, including all values and subranges in between.

In embodiments where the signal generator 110 includes two channels and generates a second frequency-multiplied pulse train at the output of a second frequency multiplier circuit, the emission detector 140 can be configured to receive the second frequency-multiplied pulse train and further configured to mix the second frequency-multiplied pulse train and the received emission signal, at the mixAMC, to generate a downconverted emission signal within the bandwidth of the bandwidth-limited component.

The emission detector 140 can be configured for measuring/analyzing the emission signal based on any suitable approach such as, for example, a coherent signal averaging approach. In coherent signal averaging, a digitizer with signal averaging capability through a field-programmable gate array (FPGA) chip or other processor is used to digitize the amplified molecular free induction decay signals. The digitizer also receives a trigger signal from the trigger source 105 of the signal generator 110 (that indicates that it should begin collection). The experiment is repeated numerous times (the typical number of acquisitions range from 1,000 to 10,000,000 or possibly even more). With proper phase coherence in the excitation pulses, the molecular signals occur with the same amplitude and phase each time. Averaging or accumulating these electronic signals representing these repeated acquisitions increases the signal-to-noise ratio (SNR) of the resulting signal due to suppression of incoherent noise. The accumulated trace is then transferred off the digitizer card, processed, and Fourier transformed to yield the frequency spectrum of the sample emission.

In some embodiments, the emission detector 140 can be configured for heterodyne detection. In some embodiments, the emission signal is measured based on the trigger signal (e.g., a voltage spike) from the signal generator 110, as illustrated in FIG. 1, or based on an external trigger signal from the trigger source 105, such as a signal from a photodetector in response to detection of a pulse of light. In this manner, the bandwidth-limited component can begin detection of the emission upon receiving the trigger signal, thereby maintaining phase coherence between the emission and the local oscillator used for heterodyne detection. Aspects of this approach eliminate the need for separate mechanisms to synchronize the detection and the excitation for purposes of phase reproducibility. More specifically, in some embodiments, the signal generator 110 is not locked to any fixed-frequency reference standard or source for frequency mixing (i.e., the trigger source 105, an example fixed-frequency standard, can be absent). Eliminating frequency mixing, frequency standards, and/or the like for generating pulse trains significantly reduces the overall complexity and cost for the system 100.

For instance, a digital delay pulse generator can be used to generate the triggers. The pulse generator puts out square wave pulses at a fixed repetition rate (for example, 10 Hz). The output of this pulse generator is put into the 'trigger input' function of an arbitrary waveform generator (AWG) that acts as the signal generator 110. Each time the AWG receives a trigger input, it puts out a waveform set that conducts the desired experiment, which may consist of one chirp, one transform-limited pulse, or a train of multiple chirps or transform-limited pulses, or any other combination of waveforms. Because all of the excitation waveforms come out of the AWG, and the AWG also provides a signal to the digitizer to tell it when to acquire, there is no requirement on the phase precision, reproducibility, or jitter of the digital delay pulse generator. The AWG may also be synchronized with the digitizer that digitizes the signals emitted by the sample. For instance, the AWG may send the 'acquire' signal to the digitizer so that the digitizer is effectively locked to the AWG's internal timebase. Alternatively, the digitizer may receive the trigger signal, and then the digitizer could trigger the AWG to tell it to initiate waveform generation.

The system 100 can be in communication with other devices (not shown) via, for example, one or more networks, each of which can be any type of network such as, for example, a local area network (LAN), a wide area network (WAN), a virtual network, a telecommunications network, a data network, and/or the Internet, implemented as a wired network and/or a wireless network. In some embodiments, any or all communications can be secured using any suitable type and/or method of secure communication (e.g., secure sockets layer (SSL)) and/or encryption. In other embodiments, any or all communications can be unsecured.

Direct Multiplication Fourier Transform Millimeter-Wave Spectroscopy Methods

Figure 2:
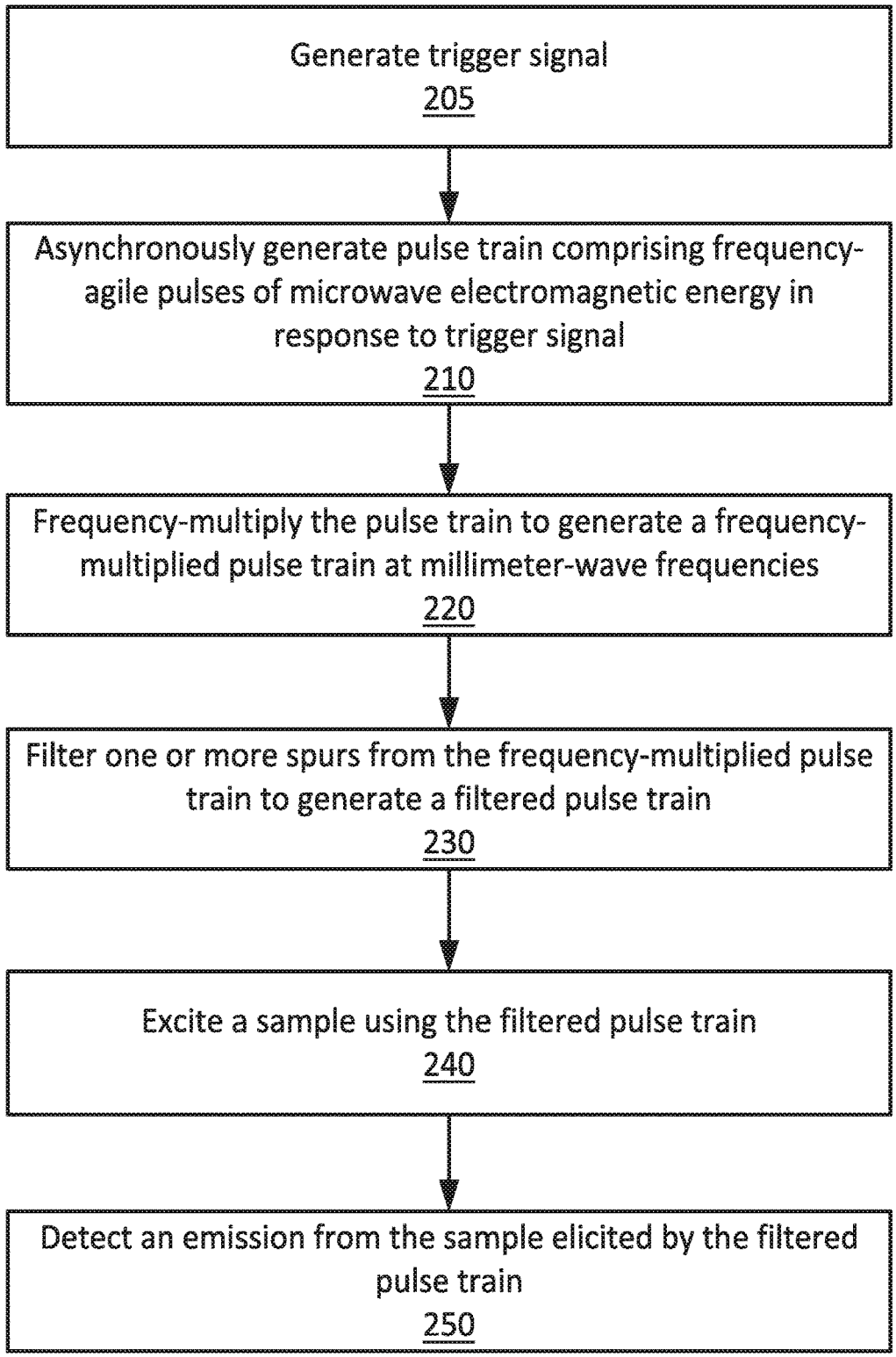
FIG. 2 is a method for Fourier transform millimeter wave spectroscopy, according to embodiments.

FIG. 2 illustrates a method 200 of direct multiplication Fourier transform millimeter-wave spectroscopy. In some embodiments, the method 200 can be carried out by the system 100, by a structural variant thereof, and/or a functional variant thereof. The method 200 includes, optionally at 205, generating a trigger signal. This trigger signal may be programmed into the signal generator or may come from an external source, such as a separate user input or a photodetector that senses a pulse of light.

The method 200 includes, at 210, generating one or more pulses of microwave electromagnetic energy with a suitable signal generator. For instance, the signal generator may emit a pulse train that includes frequency agile pulses (e.g., a frequency sweep) of microwave electromagnetic energy. In some embodiments, the pulse train includes at least one chirped pulse within a frequency range from about 1 GHz to about 3 GHz.

The signal generator may be a free-running signal generator that generates the pulse(s) in response to the trigger signal without waiting for the next edge or pulse of a clock from an external frequency reference. Put differently, the signal generator may generate the pulse(s) asynchronously, i.e., immediately upon receipt of the trigger signal without waiting for the current clock cycle to finish. Conversely, a signal generator locked to an external frequency standard would generate the pulse(s) synchronously, i.e., at the end of the clock cycle during which the signal generator receives the trigger signal. Synchronous pulse generation can sometimes create an undesirable lag between the trigger signal and the pulse. This lag may vary by up to one clock cycle if the trigger signal is not synchronized to the signal generator's external frequency standard. Asynchronous signal generation is not susceptible a variable lag between the trigger signal and the pulse because the signal generator does not wait for an external clock to generate the pulse.

The method 200 also includes, at 220, frequency-multiplying the pulse(s) to a specified frequency to generate one or more frequency-multiplied pulses. In some embodiments, the specified frequency is a millimeter-wave frequency or encompasses a band of millimeter-wave frequencies, e.g., in a range from about 75 GHz to about 110 GHz. The particular frequency or frequency band of the frequency-multiplied pulses may be selected to match or encompass one or more known or suspected resonance frequencies of the sample.

The method 200 also includes, at 230, filtering one or more spurs from the frequency-multiplied pulse(s) to generate one or more filtered pulse(s). These spurs may include spurious intermodulation products, spurious harmonics, or both produced by the frequency multiplication in step 220. In some embodiments, this filtering may be performed using a cavity bandpass filter.

The method 200 also includes, at 240, exciting a sample (e.g., placed in the sample chamber 130) using the filtered pulse(s). For instance, the filtered pulse transmission may be transmitted to or through a sample holder by an antenna, such as a horn antenna, to excite the sample. If the filtered pulses are resonant with the sample or one or more of the sample's constituents, the filtered pulses may induce the sample to emit a free induction decay (FID) emission or other observable signal.

The method 200 also includes, at 250, detecting an emission, such as an FID emission, from the sample that is elicited at least in part by the filtered pulse train. For example, step 250 can be performed by the emission detector 140, e.g., in response to the trigger signal produced in step 205. More specifically, the emission detector 140 may mix the FID emission with another component of the filtered pulse(s) to produce a downconverted FID emission. For example, a first millimeter-wave pulse can be used to excite the sample at 240, and a second millimeter-wave pulse can be mixed with the emission at 250 to generate the downconverted FID emission. The emission detector 140 may amplify the downconverted FID emission, then frequency-multiply it to produce a signal in a band suitable for digitizing and processing.

In embodiments where the signal generator generates a pulse train in response to the trigger signal, the sample may produce one emission per pulse in the pulse train. If the pulses in the pulse train are phase coherent with each other, then the emissions will be phase coherent with each other too. In these embodiments, the emission detector 140 may accumulate or average the emissions to beat down incoherent noise. By beating down incoherent noise, the emission detector makes more sensitive measurement, increases the measurement SNR, or both.

In some embodiments, the pulse train is a first pulse train and the frequency-multiplied pulse train is a first frequency-multiplied pulse train, and the method 200 also includes generating a second pulse train that includes frequency-agile pulses of microwave electromagnetic energy. The second pulse train is coordinated with the first pulse train, i.e., the second pulse train and the first pulse train have a well-defined frequency and phase relationship. The method 200 can further include frequency multiplying the second pulse train to the specified frequency to generate an frequency-multiplied second pulse train (e.g., via a second frequency multiplier circuit of the signal processor 120). In such embodiments, the detecting at step 250 can include mixing the frequency-multiplied second pulse train and the received emission to generate a downconverted emission signal within the bandwidth of a digitizer/an analog-to-digital converter (ADC).

In some embodiments, the system may repeat one or more steps of the method 200, e.g., to make a more sensitive measurement, to increase the measurement SNR, or both. For instance, the system may repeat the entire method 200 for each of several trigger signals. Again, if the pulses produced in response to the trigger signals are phase coherent with each other, then the emissions will be phase coherent with each other too. In these embodiments, the emission detector 140 may accumulate or average the emissions to improve measurement sensitivity increase the measurement SNR, or both.

Microwave to Millimeter-Wave Frequency Multiplication for Spectroscopy

FIG. 3 illustrates an example system 300 for direct multiplication Fourier transform millimeter wave spectroscopy, which can be similar to the system 100. In some embodiments, the system 300 is configured to perform the method 200. The system 300 is a Fourier transform millimeter wave spectroscopy system that generates both a millimeter-wave excitation pulse (e.g., a pulse in a first pulse train) and a local oscillator pulse (e.g., a pulse in a second pulse train) for downconverting molecular emission pulses via direct frequency multiplication from a free-running (unsynchronized) microwave frequency source 310 (such as an arbitrary waveform generator as illustrated here, direct digital synthesizer, or a voltage controlled oscillator-based synthesizer).

One feature of the system 300 is the absence of any frequency mixers for upconversion. (The system does include a millimeter wave mixer in the emission detector 340 to convert the high-frequency molecular signals into microwave signals.) Another feature of the system 300 is the absence of any fixed-frequency reference standards or sources for synchronization. The timebase is determined by the frequency source 310 alone. (In some embodiments, the frequency source 310 may be locked to a frequency reference, such as a Rubidium clock, to increase its frequency stability.) Eliminating frequency mixing, local oscillators, and frequency standards for generating and locking local oscillators to the frequency source 310 significantly reduces the system's complexity and cost. It also provides several advantages and new modes of operation as described below.

Determining the timebase using the frequency source 310 (instead of a frequency reference, such as a 10 MHz clock) makes it convenient to synchronize the operation of the system (e.g., spectral measurements) to external events. Some examples of these events can be, but are not limited to, pulsed lasers, molecular discharge sources, process monitoring events, and/or the like. These events may serve as triggers, which can be represented by electrical signals (e.g., a voltage spike), that cause the emission detector 340 to begin acquisition. Because the timebase is defined by the frequency source 310, this trigger event does not have to be locked to a 10 MHz clock or other external reference in order to maintain phase reproducibility from one acquisition to the next (which is needed to perform time domain signal averaging to improve sensitivity). In this manner, the system 300 can perform phase coherent heterodyne detection without a frequency reference or a phase-locked local oscillator.

In some embodiments, the system 300 is configured as a high-resolution instrument designed for the measurement and analysis of broadband rotational spectra in the (i.e., has a total instrument bandwidth of) 75-110 GHz frequency range. In some embodiments, the system 300 has an instantaneous bandwidth of about 750 MHz. In some embodiments, the source 310 includes a 12 Gs/s, 2-channel AWG that can create pulses within a frequency band of about 2-4 GHz. In some embodiments, the signal processor includes a frequency multiplier circuit 320 and a solid-state active multiplier chain 320b. In some embodiments, the emission detector 340 includes a heterodyne receiver and a digitizer configured to perform real-time accumulation or averaging.

In some embodiments, the system 300 is configured for multiple modes of operation including, but not limited to, a fast survey (e.g., measuring broadband spectra with a segmented approach, with 720 MHz of bandwidth covered in each segment), a high dynamic range (HDR) survey (for a dynamic range of up to $10^5$), a nutation curve (used to determine the duration of pi/2 and pi pulses for advanced pulse sequences), a broadband double resonance (used to find quantum state connections between different transitions in the spectrum), and a synchronized HDR survey (to allow synchronous coupling to a pulsed sample source, such as a pulsed nozzle or pulsed laser source). In some embodiments, the duration and bandwidth of the pulses depends on the measurement mode. In some embodiments, the pulses are frequency multiplied using a frequency-multiplication circuit 320a, which may include one or more frequency doublers and filters, and multiplied by a factor of six with active multiplier chains (AMCs) 320b to reach a measurement bandwidth of about 75-110 GHz.

The frequency-multiplied signal is applied to the sample, which may be a gas that is introduced to sample chamber 330 via a pulse nozzle. In some embodiments, the sample chamber 330 is separate from the system 300, and is included in a kit along with the system 300.

In some embodiments, the second channel of the AWG 310 is used for heterodyne detection in a millimeter-wave mixer (part of 340). A second set of pulses generated through the AWG 310 are frequency-multiplied and amplified to the appropriate frequency range and power level to provide the local oscillator for the mixer using the frequency-multiplication circuit 320a and a mixAMC in the detector 340. These local oscillator pulses are phase-coherent with the excitation pulses applied to the sample because they are generated with the same signal generator 310. The local oscillator pulses may also be frequency shifted with respect the excitation pulses, e.g., by about 720 MHz to about 1440 MHz, for heterodyne detection.

The downconverted signals at <2 GHz are recorded on a high-speed digitizer with real time signal accumulation capabilities. In some embodiments, the emission detector includes a port (not shown) for connecting to higher-bandwidth detectors (e.g., oscilloscopes) to measure higher instantaneous bandwidths, such as, for example, up to 11 GHz.

Asynchronous Triggering for Millimeter-Wave Spectroscopy

Figure 4:
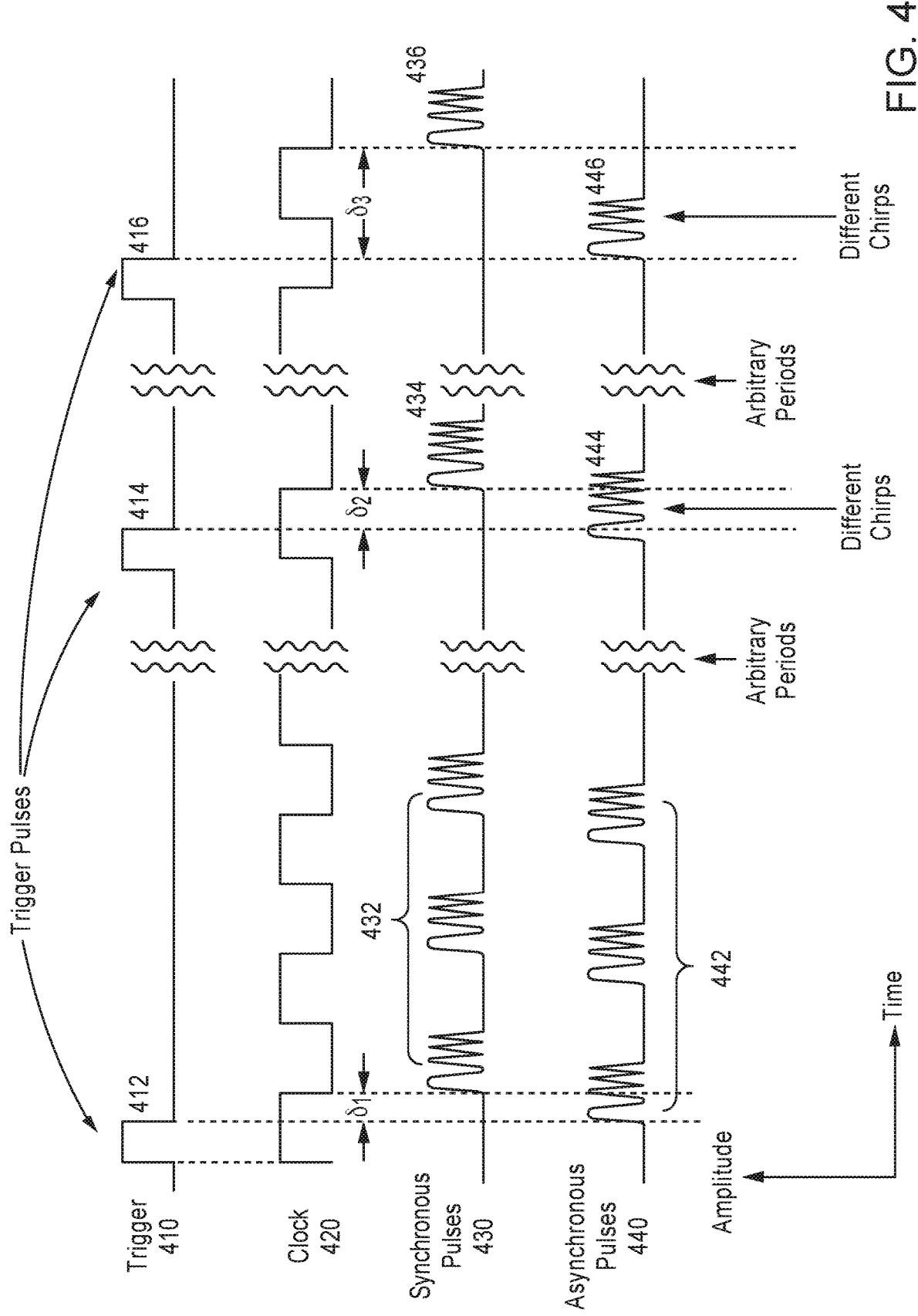
FIG. 4 is a time-domain plot that illustrates generation of one or more frequency-agile pulses in response to a trigger signal.

FIG. 4 shows a time-domain plot of a trigger signal 410 and asynchronous chirped pulses 440 as would be generated by the systems shown in FIGS. 1 and 3 according to the method shown in FIG. 2. FIG. 4 also shows a clock signal 420 as would be generated by an external frequency source and used in a conventional spectroscopy system as well as synchronous chirped pulses 430 generated by a conventional spectroscopy system based on the trigger signal 410 and the clock signal 420.

In the example of FIG. 4, the asynchronous chirped pulses 440 are produced in response to the trigger signal 410 by a signal generator (e.g., the signal generator 110), according to example embodiments. Here, the trigger signal 440 comprises square-wave pulses, with a falling edge of each pulse in the trigger signal 440 triggering operation of the signal generator. In other embodiments, the trigger signal may have another shape and/or the signal generator may be triggered by another event, such as the rising edge of a pulse.

The signal generator produces a pulse train 442 of three chirped pulses in response to the falling edge of a first pulse 412 in the trigger signal 410. After an arbitrary period of time (e.g., a non-integer multiple of the period of the pulse train's carrier frequency), a second pulse 414 in the trigger signal 410 again triggers the signal generator, which produces a single chirped pulse 444, and so on. In some embodiments, the signal generator is further configured to maintain pulse characteristics across pulses generated by different triggers (e.g., each pulse has the same phase, as shown in FIG. 4).

FIG. 4 shows that the asynchronous pulses 440 generated by the signal generator occur immediately in response to the corresponding pulses of the trigger signal 410. (In practice, there may be slight delay between the falling edge of the trigger pulse and the rising edge of the corresponding asynchronous pulse due signal propagation and processing time.) FIG. 4 also shows that there are variable lags (depicted as $\delta_1$, $\delta_2$, and $\delta_3$) between the trigger pulses and the corresponding synchronous pulses 430. These variable lags represent the time between the falling edges of the trigger pulses 410 and the subsequent falling edges of the clock signal 420 from the external frequency reference.

In this example, the leading edge of the first trigger pulse 412 is aligned with a pulse in the clock signal 420, so the lag $\delta_1$ between the falling edge of the first trigger pulse 412 and the leading edge of the corresponding synchronous pulse train 432 equals the difference between the width of the first trigger pulse 412 and half the clock period (for a clock with a 50% duty cycle). The lags $\delta_1$ and $\delta_2$ between the second trigger pulse 414 and second synchronous pulse 434 and the third trigger pulse 416 and third synchronous pulse 436, respectively, are different (here, smaller and larger, respectively) because the trigger signal 410 is not synchronized to the clock signal 420. This variable delay makes it difficult, if not impossible, to trigger sample emission acquisition based on events that occur arbitrarily. Examples of such events include, but are not limited to, signals from pulse valves such as pulse nozzle valves, metering/sensing instruments such as pressure meters, thermometers, and/or the like. For example, such events (e.g., a predetermined temperature threshold is met for a sample) can be indicative of the need to run a Fourier transform spectroscopy measurement on the sample as described herein.

While FIG. 4 illustrates that the duration between successive trigger signals is greater than the duration of the pulse train, this need not always be the case. If the signal generator receives another trigger before the pulse train ends, it may ignore the other trigger, restart the analysis, discard the last run and replace it with the new one, or go on to a different analysis entirely. It will be understood that depending on the nature of the process used to generate the trigger signal, the periodicity of the trigger signal can be deterministic, or indeterminable from the viewpoint of the system 100.

FIG. 4 also illustrates that, in some embodiments, each pulse or pulse train can have characteristics (e.g., number of pulses, pulse duration, pulse repetition frequency, pulse carrier frequency, and/or the like) independent of other pulse trains. For example, the pulse train 446 comprises a single chirped pulse of four periods, distinguishable from the five-period single chirped pulse 444 and the chirped pulse train 442, which includes three pulses of four periods each. In some embodiments, the signal generator is further configured to vary pulse characteristics across pulses generated by different triggers such as, for example, to scan across a frequency bandwidth. In some embodiments, the signal generator is further configured to vary pulse characteristics across pulses generated by different triggers such as, for example, to switch between a first set of pulse characteristics for a first pulse/first set of pulses and a second set of pulse characteristics for a second pulse/second set of pulse characteristics.

Filtering Spurs from Frequency-Multiplied Signals

Figure 5A:
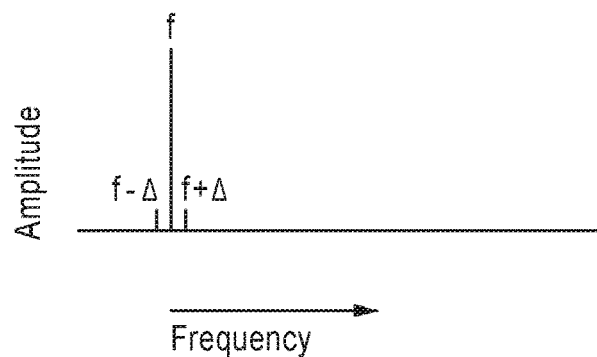
FIGS. 5A-5E illustrate frequency multiplication of a modulated tone and filtering of harmonics due to frequency multiplication.

FIGS. 5A-5E show changes in the frequency profile/spectrum of a sinusoidally modulated tone emitted by the signal generator 110 of FIG. 1 as it is processed by various components of the system 100, according to example embodiments. FIG. 5A shows the spectrum of the modulated tone generated by the signal generator 100. The tone is at a center frequency f with the modulation represented by sidebands at frequencies f−Δ and f+Δ. Generally, any tone produced by signal generator, such as an arbitrary waveform generator, would likely have several spurious components at different signal levels.

Figure 5B:
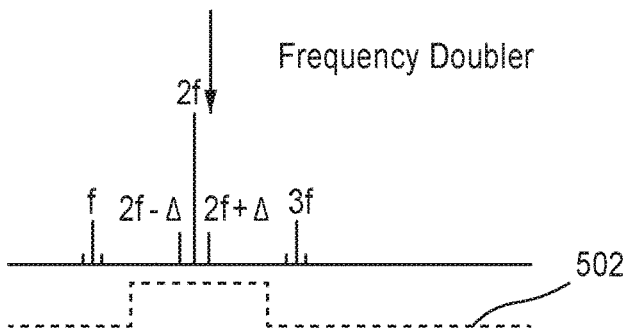

FIG. 5B shows the tone and sidebands after frequency doubling, such as via a frequency doubler of the frequency multiplier circuit 120. Frequency doubling shifts the center frequency to 2f and the modulation to 2f−Δ and 2f+Δ. Additionally, frequency doubling produces spurious harmonics at frequencies f and 3f with modulated sidebands at f−Δ and f+Δ and at 3f−Δ and 3f+Δ, and (not shown) could also product additional mixing products at f+2Δ and f−2Δ. FIG. 5B also illustrates the passband 502 of a filter (e.g., filter 125) that is subsequently applied to the frequency-doubled chirp to remove the harmonics and their sidebands.

Figure 5C:
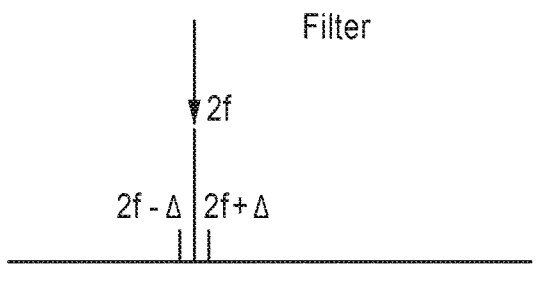
Figure 5D:
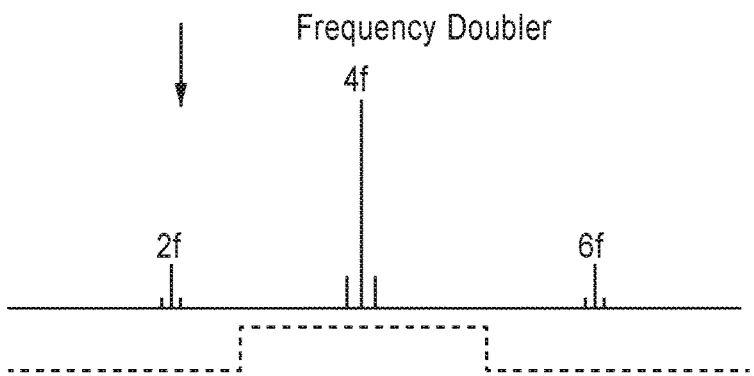
Figure 5E:
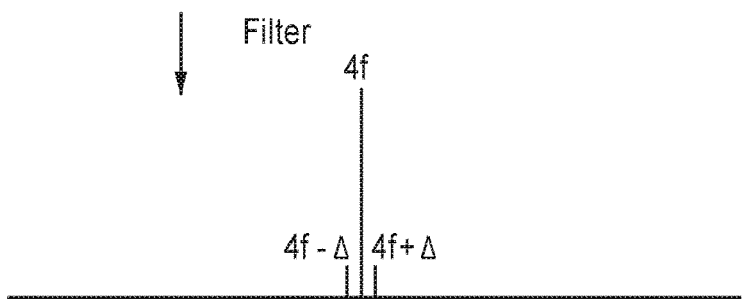

FIG. 5C shows the frequency-doubled modulated tone after the harmonics at f and 3f, along with their respective sidebands, have been filtered out. In this manner, undesired harmonics and other spurious signals can be removed during signal processing by the frequency multiplier circuit 120 and (optionally) the filter 125. FIG. 5D illustrates a chirp that is generated by frequency doubling the signal shown in FIG. 5C, resulting in a signal with center frequency that is four-fold (4f) that of the signal emitted from the signal generator, and again includes harmonics plus associated sidebands at frequencies 2f and 6f Another filter is applied to remove the harmonics and their associated spurs to generate the signal of FIG. 5E, having a center frequency of 4f and associated spurs at 4f−Δ and 4f+Δ.

Figure 6A:
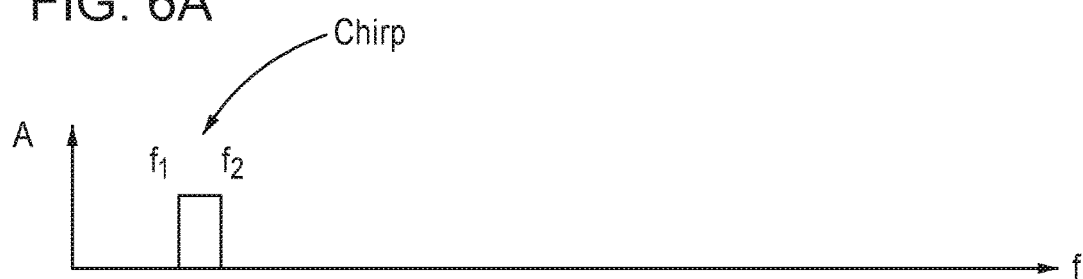
FIGS. 6A-6E illustrate frequency multiplication of a chirped pulse and filtering of harmonics due to frequency multiplication.
Figure 6B:
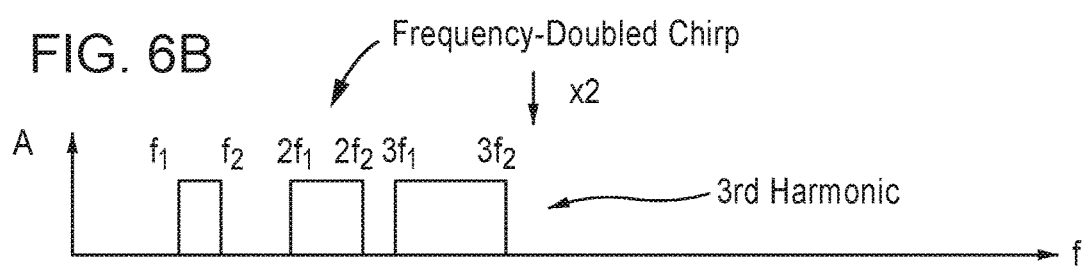

FIGS. 6A-6E show the changes in the frequency profile/spectrum of a chirp emitted by the signal generator as it is processed by various components of the system 100. FIG. 6A shows that the chirp has a frequency range from about $f_1$ to about $f_2$ (e.g., 1.5 GHz to 2.0 GHz), with a bandwidth of $f_2$-$f_1$ (e.g., 500 MHz). FIG. 6B shows the changes to the spectrum after frequency doubling. The frequency doubled chirp has a frequency range from about $2f_1$ to about $2f_2$ (e.g., 3 GHz to 4 GHz), with one spurious harmonic chirp spanning a frequency range from $f_1$ to $f_2$, and a spurious third-harmonic chirp spanning a range from $3f_1$ to $3f_2$ (e.g., 4.5 GHz to 6 GHz).

Figure 6C:
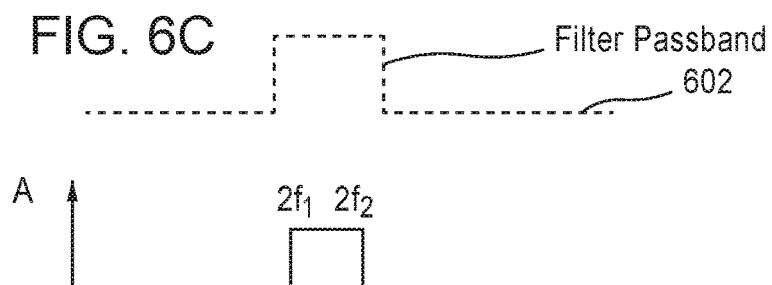

FIG. 6C illustrates the frequency-doubled modulated tone after the spurious harmonics $f_1$-$f_2$ and $3f_1$-$3f_2$ have been filtered out using a filter with a filter passband 602. The shape of the filter passband 602 depends in part on the difference between the highest frequency spectral component of the fundamental ($f_2$) and the lowest frequency spectral component ($2f_1$) of the frequency-doubled pulse, as well as the difference between the highest frequency spectral component ($2f_2$) of the frequency-doubled pulse and the lowest frequency spectral component ($3f_1$) of the spurious third harmonic. The lower the difference, the sharper the cutoff of the filter needs to be to effectively remove the spurious harmonics. As an example, if $f_1$ is about 1.56 GHz and $f_2$ is about 2.28 GHz, then the difference between the frequency $f_2$ of the fundamental and the frequency $2f_1$ of the frequency-doubled pulse is about 0.84 GHz, while the difference between the frequency $2f_2$ of the frequency-doubled pulse and the frequency $3f_1$ of the third harmonic is about 0.12 GHz. A satisfactory filter may have relatively sharp attenuation characteristics to effectively pass the frequency-doubled pulse while filtering out the nearby spurious third harmonic, and aspects of the disclosure provide for this capability by the use of one or more cavity bandpass filters in the frequency multiplier circuit 120.

Figure 6D:
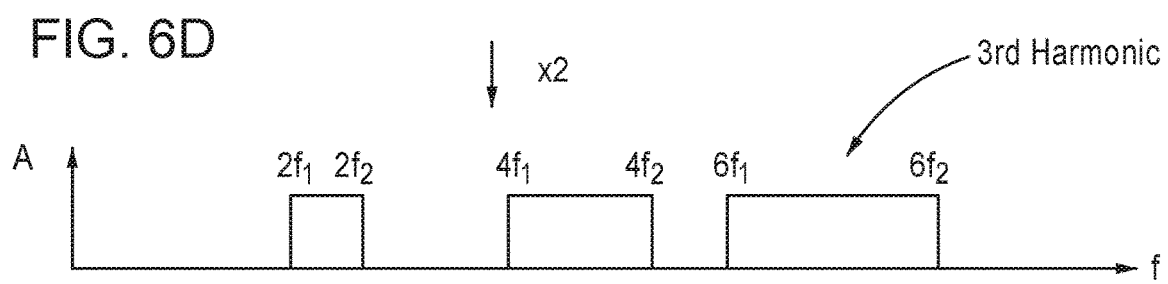
Figure 6E:
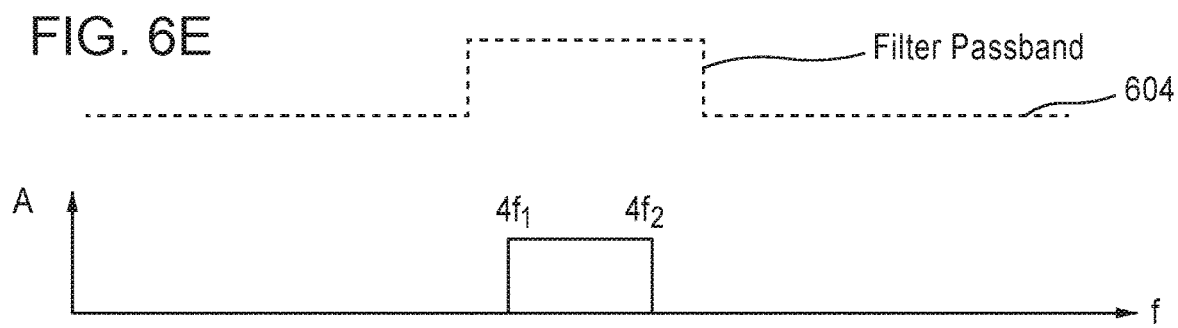

FIG. 6D illustrates the spectrum after the frequency doubling of the frequency-doubled chirped pulse shown in FIGS. 6B and 6C, resulting in a frequency-doubled pulse spanning $4f_1$ to $4f_2$ and spurious harmonics spanning bands of $2f_1$ to $2f_2$ and $6f_1$ to $6f_2$. As described above, the spurious harmonics are filtered with a filter having a filter passband 604 whose shape depends in part on the difference between the frequency $2f_2$ of the fundamental and the frequency $4f_1$ of the frequency-doubled pulse, as well as the difference between the frequency $4f_2$ of the frequency-doubled pulse and the frequency $6f_1$ of the spurious third harmonic $6f_1$-$6f_2$. As an example, if $f_1$ is about 1.56 GHz and $f_2$ is about 2.28 GHz, then the difference between the frequency $2f_2$ of the spurious harmonic $2f_1$-$2f_2$ and the frequency $4f_1$ of the frequency-doubled pulse is about 1.68 GHz, while the difference between the frequency $4f_2$ of the frequency-doubled pulse and the frequency $6f_1$ of the spurious harmonic $6f_1$-$6f_2$ is about 0.24 GHz. The filter 604 can hence relatively less sharp attenuation characteristics than the filter 602 to effectively filter away the harmonics at $2f_1$-$2f_2$ and $6f_1$-$6f_2$ (see FIG. 6E). In this manner, by using a high performance bandpass filter, such as a cavity bandpass filter, earlier in the frequency-multiplication circuit 120, less exacting demands are placed on subsequent/downstream filters.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

CONCLUSION

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    generating at least one pulse of microwave electromagnetic energy;
    frequency-multiplying the at least one pulse to generate at least one frequency-multiplied pulse without up-converting the at least one filtered pulse;
    filtering at least one spurious harmonic of the at least one frequency-multiplied pulse to generate at least one filtered pulse, the at least one spurious harmonic generated by frequency-multiplying the at least one pulse;
    exciting a sample using the at least one filtered pulse; and
    detecting an emission from the sample, the emission elicited at least in part by the at least one filtered pulse.

2. The method of claim 1, wherein generating the at least one pulse includes generating at least one chirped pulse within a frequency range from about 1 GHz to about 3 GHz.

3. The method of claim 1, wherein the at least one frequency-multiplied pulse has a frequency in a range from about 75 GHz to about 110 GHz.

4. The method of claim 1, wherein the filtering includes filtering the at least one spurious harmonic using a cavity bandpass filter.

5. The method of claim 1, wherein the generating includes generating the at least one pulse in response to a trigger signal.

6. The method of claim 5, wherein the detecting includes detecting the emission in response to the trigger signal.

7. The method of claim 1, wherein the at least one pulse comprises a first pulse, further comprising:
    generating a second pulse of microwave electromagnetic energy, the second pulse synchronized with the first pulse; and
    frequency-multiplying the second pulse generate a second frequency-multiplied pulse,
    the detecting including mixing the second frequency-multiplied pulse and the emission to generate a down-converted emission signal within the bandwidth of an analog-to-digital converter (ADC).

8. The method of claim 1, wherein the detecting includes heterodyne detection.

9. An apparatus, comprising:
    a signal generator configured to generate at least one pulse of microwave electromagnetic energy;
    a frequency multiplier circuit operably coupled to the signal generator, the frequency multiplier circuit configured to frequency-multiply the at least one pulse to generate at least one frequency-multiplied pulse without up-converting the at least one pulse;
    a filter circuit operably coupled to the frequency multiplier circuit, the filter circuit configured to filter at least one spurious harmonic of the at least one frequency-multiplied pulse to generate at least one filtered pulse, the at least one spurious harmonic generated by frequency-multiplying the at least one pulse, the filter circuit further configured to excite a sample using the at least one filtered pulse; and
    an emission detector configured to detect an emission from the sample, the emission elicited at least in part by the at least one filtered pulse.

10. The apparatus of claim 9, wherein the signal generator is further configured to generate the at least one pulse as at least one chirped pulse within a frequency range from about 1 GHz to about 3 GHz.

11. The apparatus of claim 9, wherein the at least one frequency-multiplied pulse has a frequency in a range from about 75 GHz to about 110 GHz.

12. The apparatus of claim 9, the filter circuit including a cavity bandpass filter.

13. The apparatus of claim 9, wherein the signal generator is further configured to generate the at least one pulse in response to a trigger signal.

14. The apparatus of claim 13, wherein the emission detector is further configured to detect the emission in response to the trigger signal.

15. The apparatus of claim 9, wherein the at least one pulse comprises a first pulse,
wherein the signal generator is further configured to generate a second pulse of microwave electromagnetic energy, the second pulse synchronized with the first pulse,
wherein the frequency multiplier circuit is further configured to frequency-multiply the second pulse to generate a second frequency-multiplied pulse, and
wherein the emission detector is further configured to mix the second frequency-multiplied pulse and the emission to generate a downconverted emission signal within the bandwidth of an analog-to-digital converter (ADC).

16. The apparatus of claim 9, wherein the emission detector is further configured to detect via heterodyne detection.

17. A method, comprising:
generating, with a free-running signal generator, at least one pulse of microwave electromagnetic energy;
frequency-multiplying the at least one pulse to generate at least one frequency-multiplied pulse;
exciting a sample using the at least one frequency-multiplied pulse; and
detecting an emission from the sample, the emission elicited at least in part by the at least one frequency-multiplied pulse.

18. The method of claim 17, further comprising filtering at least one spurious harmonic of the at least one frequency-multiplied pulse to generate at least one filtered pulse, the at least one spurious harmonic generated by frequency-multiplying the at least one pulse,
wherein the exciting includes exciting the sample using the at least one filtered pulse.

19. The method of claim 17, wherein the generating includes generating the at least one pulse in response to a trigger signal from a trigger signal source external to the signal generator.

20. The method of claim 19, wherein the detecting includes detecting the emission in response to the trigger signal.

* * * * *